(12) United States Patent  
Fish et al.

(10) Patent No.: US 8,836,197 B2  
(45) Date of Patent: Sep. 16, 2014

(54) BRUSH HOLDER HAVING RADIO FREQUENCY IDENTIFICATION (RFID) TEMPERATURE MONITORING SYSTEM

(75) Inventors: William Earl Fish, Amsterdam, NY (US); Frank Austin Scalzo, III, Rotterdam Junction, NY (US); Albert Eugene Steinbach, Rotterdam, NY (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 13/428,811

(22) Filed: Mar. 23, 2012

(65) Prior Publication Data

US 2013/0249355 A1    Sep. 26, 2013

(51) Int. Cl.
*H02K 11/00* (2006.01)
*H02K 13/00* (2006.01)

(52) U.S. Cl.
USPC ............. 310/239; 310/248; 310/349

(58) Field of Classification Search
CPC ...... H02K 11/0047; H02K 13/00; H02K 5/10
USPC ......................... 310/202, 248, 247
See application file for complete search history.

(56) References Cited

U.S. PATENT DOCUMENTS

| | | | |
|---|---|---|---|
| 3,654,504 A | 4/1972 | Susdorf et al. | |
| 4,272,695 A * | 6/1981 | Buchwald et al. | 310/242 |
| 4,316,186 A | 2/1982 | Purdy et al. | |
| 4,344,072 A * | 8/1982 | Harper, Jr. | 340/648 |
| 4,528,557 A | 7/1985 | Braun | |
| 4,723,084 A | 2/1988 | Reynolds | |
| 4,739,208 A | 4/1988 | Kimberlin | |
| 4,743,787 A | 5/1988 | Bunner et al. | |
| 5,214,410 A | 5/1993 | Verster | |
| 5,870,026 A | 2/1999 | Challenger | |
| 6,232,870 B1 | 5/2001 | Garber et al. | |
| 7,405,663 B2 | 7/2008 | Lieffort et al. | |
| 7,633,259 B2 | 12/2009 | Fish | |
| 2003/0011388 A1* | 1/2003 | Klaar | 324/723 |
| 2005/0110362 A1* | 5/2005 | Yu | 310/242 |
| 2005/0122227 A1* | 6/2005 | Itou et al. | 340/648 |
| 2009/0267782 A1* | 10/2009 | Mark et al. | 340/648 |
| 2009/0296777 A1 | 12/2009 | Fish | |
| 2013/0218514 A1* | 8/2013 | Schieke et al. | 702/138 |

OTHER PUBLICATIONS

U.S. Appl. No. 13/229,962, filed Sep. 12, 2011.
U.S. Appl. No. 13/074,370, filed Mar. 29, 2011.

* cited by examiner

*Primary Examiner* — Terrance Kenerly
(74) *Attorney, Agent, or Firm* — Hoffman Warnick LLC; Ernest G. Cusick

(57) ABSTRACT

An apparatus including: a brush holder; a radio frequency identification (RFID) device affixed to the brush holder, the RFID device including: a temperature sensor system for determining temperature(s) at one or more distinct locations on the brush holder; and a transmitter for providing indication of the temperature(s).

18 Claims, 3 Drawing Sheets

BRUSH HOLDER HAVING RADIO FREQUENCY IDENTIFICATION (RFID) TEMPERATURE MONITORING SYSTEM

FIELD OF THE INVENTION

The subject matter disclosed herein relates to dynamoelectric machines. More particularly, the subject matter disclosed herein relates to an electrical brush holder apparatus and a related monitoring system for a dynamoelectric machine.

BACKGROUND OF THE INVENTION

Conventional dynamoelectric machines include a rotor having windings that conduct electrical current during operation of the machine. As the rotor rotates, rotating and stationary elements are used to conduct current to the rotor windings from a source external to the rotor. The rotating elements such as collector rings or commutators make contact with stationary brushes to conduct the current. These brushes are held in contact with the rotating elements by brush holders. The brush and commutator system can be subject to electrical current-related effects (e.g., brush selectivity/unequal current sharing between the parallel electrical paths through multiple brushes, sparking between the brush and collector ring or commutator, arcing between the brush and collector ring or commutator, flashover etc.) which may negatively impact performance of the dynamoelectric machine.

BRIEF DESCRIPTION OF THE INVENTION

An electrical brush holder apparatus and related monitoring system are disclosed. The apparatus includes: a brush holder; a radiofrequency identification (RFID) device affixed to the brush holder, the RFID device including: one or more temperature sensors for determining a temperature at one or more distinct locations on the brush holder; and a transmitter for providing indication of the temperature(s). The transmitter on the RFID tag communicates wirelessly with at least one antenna and a receiver.

A first aspect of the invention includes an apparatus having: a brush holder; a radio frequency identification (RFID) device affixed to the brush holder, the RFID device including: a temperature sensor system for determining temperature at one or more distinct locations on the brush holder; and a transmitter for providing indication of the temperature(s).

A second aspect of the invention includes an apparatus having: a radio frequency identification (RFID) device operably connected to a brush holder, the RFID device including: a temperature sensor system for determining temperature at one or more distinct locations on the brush holder; and a transmitter for providing indication of the temperature(s).

A third aspect of the invention includes an apparatus having: a brush holder; a radio frequency identification (RFID) device affixed to the brush holder, the RFID device including: a temperature sensor system for determining temperature at one or more distinct locations on the brush holder; and a transmitter for providing indication of the temperature(s); a RFID receiver for receiving indication of the temperature(s) from the RFID device; and an analysis system for comparing the indication to a threshold to determine a condition of a brush within the brush holder.

BRIEF DESCRIPTION OF THE DRAWING

These and other features of this invention will be more readily understood from the following detailed description of the various aspects of the invention taken in conjunction with the accompanying drawing that depicts various embodiments of the invention, in which.

Figure 2:
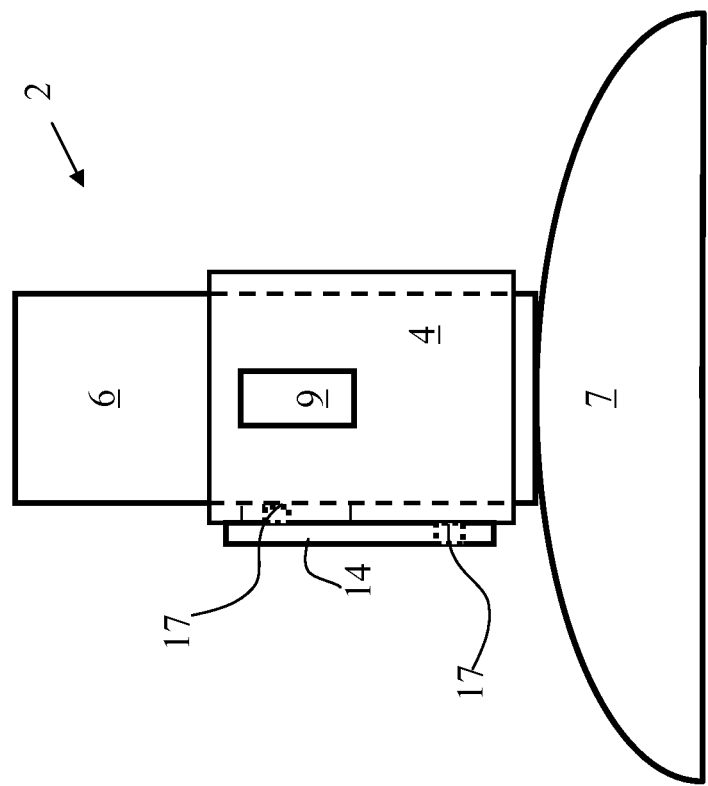
FIGS. 1-2 show a front and side schematic depiction, respectively, of an apparatus including a brush holder monitoring system, including a depiction of a relatively longer brush, according to aspects of the invention.

It is noted that the drawing of the invention is not necessarily to scale. The drawings are intended to depict only typical aspects of the invention, and therefore should not be considered as limiting the scope of the invention.

DETAILED DESCRIPTION OF THE INVENTION

The subject matter disclosed herein relates to an electrical brush holder apparatus and a related monitoring system. More particularly, aspects of the invention include an electrical brush holder apparatus and a system for monitoring the general condition of a brush holder (including a brush/commutator) apparatus. The apparatus and monitoring system can indicate whether a dynamoelectric machine brush requires replacement or adjustment during operation of that machine.

The monitoring system is configured to monitor a variety of conditions of the brush holder using sensor types including: temperature, electromagnetic, pressure, strain, acceleration, resistance, electromechanical, magnetoresistive, hall effect, current measurement and/or other suitable devices. The sensor(s) can be located on (in physical contact with) and/or proximate to, a brush holder, for assessing the general condition of the brush/commutator apparatus of the dynamoelectric machine. In one particular embodiment, temperature measurements provide a mechanism for determining whether and when to perform brush replacement or adjustment.

As noted herein, conventional dynamoelectric machines include a rotor having windings that conduct electrical current during operation of the machine. As the rotor rotates, rotating and stationary elements are used to conduct current to the rotor windings from a source external to the rotor. The rotating elements such as collector rings or commutators make contact with stationary brushes to conduct the current. These brushes are held in contact with the rotating elements by brush holders. The brush holders can be subject to electrical current-related effects (e.g., brush selectivity, flashover, shorting, etc.) which may negatively impact performance of the dynamoelectric machine.

Some previous inventions to monitor the brush health and/or brush length have required extra wires and hardware to be connected to the brush or brush holder. These extra wires and hardware are connected and disconnected with each brush replacement and generally complicate the maintenance process of changing the worn brushes. In addition, the wiring adds the additional risk of unintended electrical paths from the energized equipment. Other inventions to monitor brush health and/or brush length use thermal imaging, which is limited by line-of-sight constraints in its ability to see the hottest brush area near the rotating shaft on each brush holder on a large collector or commutator assembly. Imaging systems can also be hindered by the accumulation on the camera of dust worn from the carbon brushes.

Conventionally, brush holders include a viewing "window" (e.g., an opening) which can provide an operator (e.g., a human operator or technician) with a line of sight to the brush held within the brush holder. As the brush wears from contact with the collector ring or commutator, the top of the brush slides downward and becomes visible within the viewing window. As the brush wears even further, the top of the brush disappears from view in the viewing window, indicating that the brush is nearly or completely worn.

In contrast to these conventional brush holders, aspects of the invention provide for an apparatus and a monitoring system for determining characteristics (e.g., electrical and/or thermal characteristics) of a brush holder in a dynamoelectric machine (e.g., an electrical generator) to determine brush wear or abnormal operation. More particularly, aspects of the invention provide for an apparatus having a brush holder, and a radio frequency identification (RFID) device affixed to the brush holder. The RFID device includes at least one integrated sensor (e.g., a temperature sensor) for measuring an indicator of brush condition or wear, and an RFID transmitter for transmitting data about that indicator to a remote brush holder health monitoring system. The monitoring system can include at least one RF antenna, an RFID receiver and an analysis system, where the analysis system can compare the indicator data to determine whether the brush should be replaced or adjusted. In some cases, the analysis system can assess brush/commutator conditions by comparative temperature algorithms relating to the indicator, one or more neighboring devices, comparison to a pre-determined temperature threshold, etc.

Figure 1:
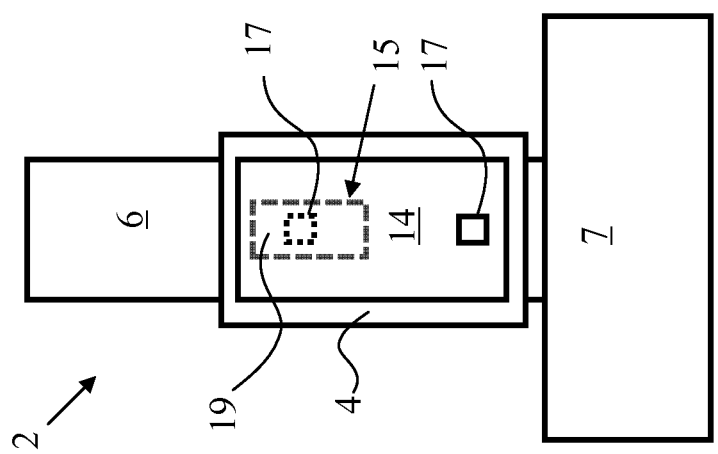

Turning to FIGS. 1 and 2, schematic front and side views of an apparatus 2, respectively, are shown according to embodiments of the invention. In this case, the apparatus 2 can include a brush holder 4 for holding an electrical brush 6 (e.g., a brush for contacting a collector or commutator 7 of a dynamoelectric machine). As is known in the art, the brush holder 4 can be formed of an electrically conductive metal including one or more of aluminum, stainless steel, brass, copper, etc. Not shown, but known in the art, the brush holder 4 can include a spring which is internally positioned in the brush holder 4 to at least partially retain the electrical brush (or simply, brush) 6 within the brush holder 4 and in contact with the collector or commutator 7. Additionally, the brush holder 4 can include a window 9 for viewing the brush 6 within the brush holder 4.

Additionally, the apparatus 2 can include a radio frequency identification (RFID) device 14 operably affixed to the brush holder 4 (e.g., on one or more faces of the brush holder 4). The RFID device 14 can include any conventional RFID device capable of transmitting a radio frequency signal to a receiver (e.g., an RFID receiver 16 shown housed within an external monitoring system in FIG. 5). The RFID device 14 can further include a transmitter (e.g., an RFID transmitter) to provide a condition indicator to an RFID receiver 16 in a brush holder monitoring system 18. Each RFID device 14 can communicate using its unique serial number, to allow for monitoring of individual brush holders 4 in a dynamoelectric machine. That is, each transmission from the RFID device 14 to a brush holder monitoring system 18 (FIG. 5) can include data about the identification of that RFID device 14 (and the associated brush holder 4). As described further herein, the RFID device 14 can include one or more antenna(e) 30, which are capable of both power generation (power generation component 32) and data transmission (transmission component 34) for the RFID device 14.

Figure 4:
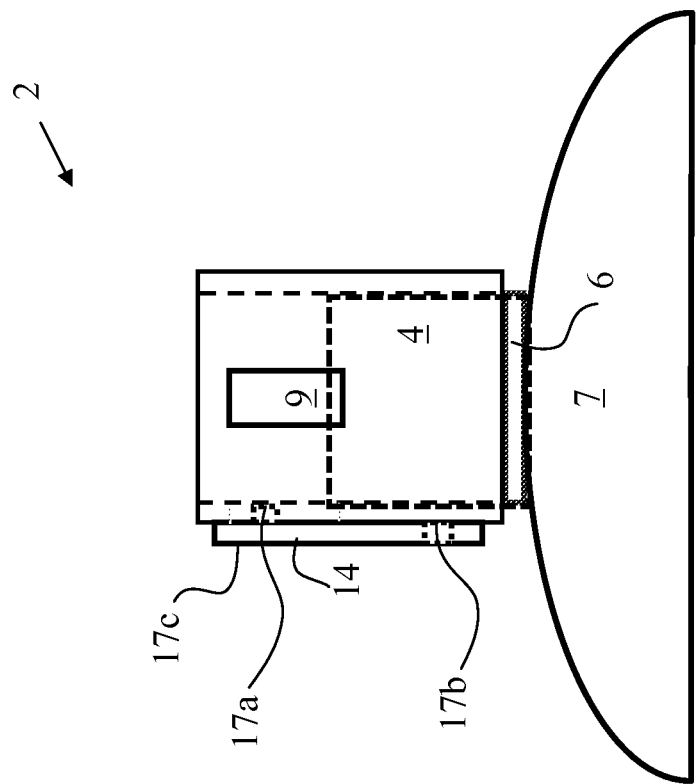
FIGS. 3-4 show a front and side schematic depiction, respectively, of an apparatus including a brush holder monitoring system, including a depiction of a relatively shorter brush, according to aspects of the invention.
Figure 3:
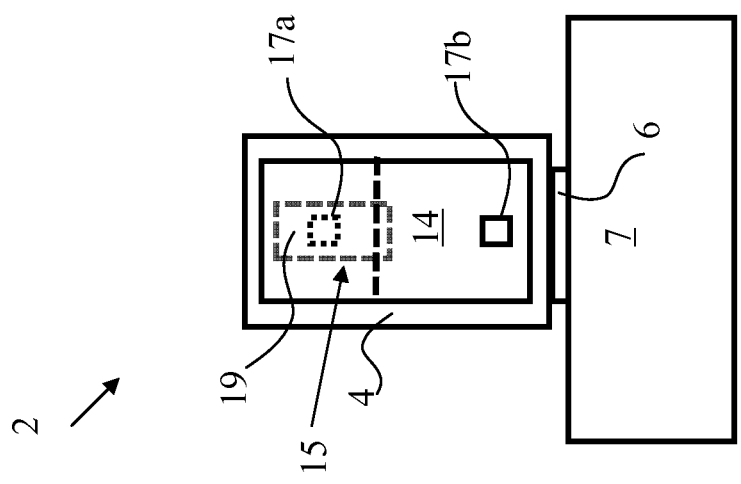
Figure 5:
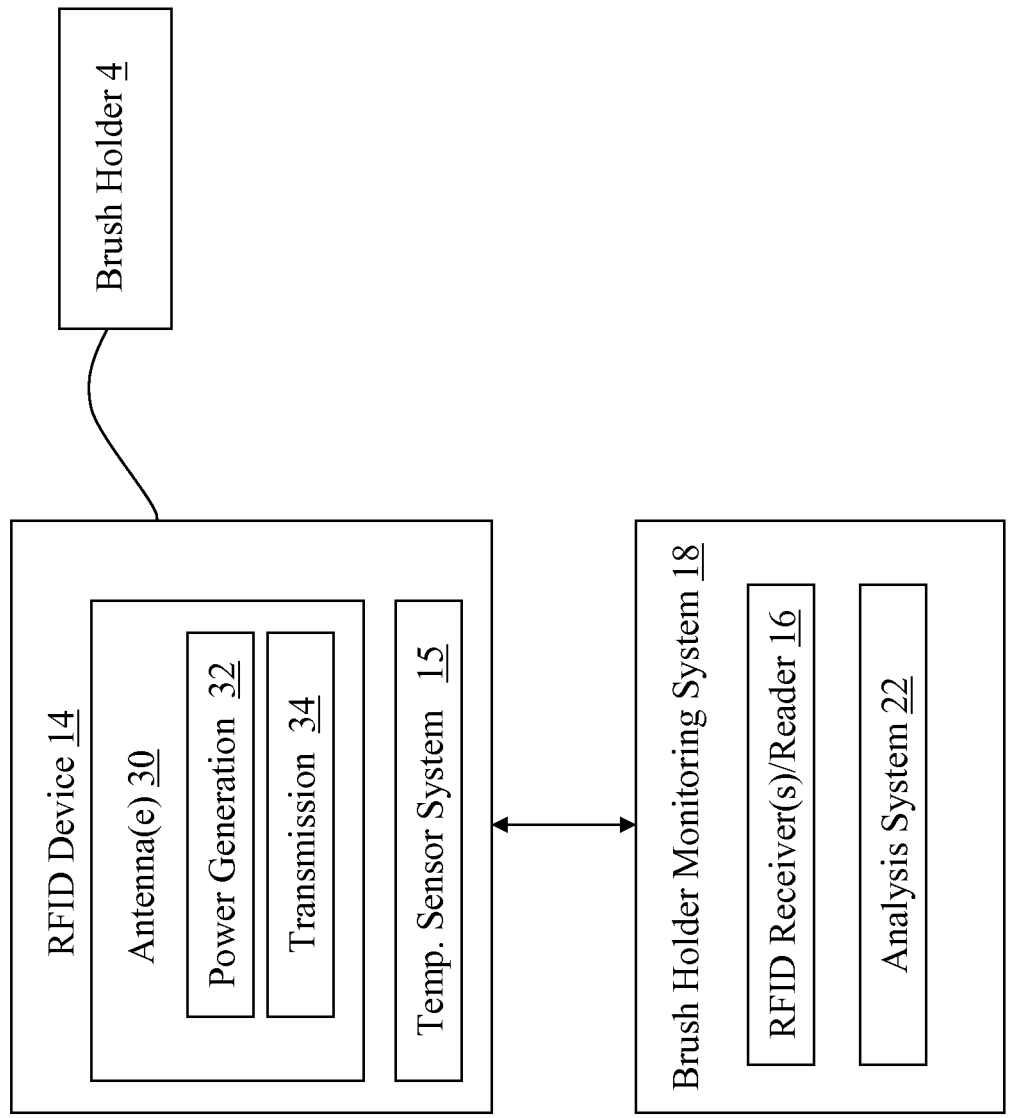
FIG. 5 shows a schematic depiction of a brush holder monitoring system according to aspects of the invention.

The RFID device 14 can further include a temperature sensor system 15 for determining temperature(s) at one or more distinct locations on the brush holder 4. The temperature sensor system 15 can include one or more temperature sensors 17 for determining a temperature of the brush holder 4 (e.g., proximate a bottom of the brush holder 4 and proximate the window 9). As the current changes in brush 6, the temperature of brush holder 4 and temperature sensor 17b will also change. The presence of sparking or arcing at the interface between brush 6 and collector ring 7 will also raise the temperature of temperature sensor 17b. Both excessively high and excessively low temperatures from temperature sensor 17b can be used to indicate a change in brush condition that the operator should investigate further. In addition, as the brush 6 wears, airflow proximate to temperature sensors 17a will change (e.g., airflow increases across the now vacant space causing cooling of the temperature sensor) the monitored temperature of those areas. In this sense, the temperature sensors (e.g., temperature sensor 17a) proximate the window 9 can detect the temperature change caused by the flow of air through the window 9. This airflow is triggered when the brush 6 is worn below the upper edge of the window 9, and the airflow increases as the brush 6 wears further. FIGS. 3-4 illustrate front and side schematic views of the apparatus 2 after wear of the brush 6. As the brush 6 wears, it may pass one or more of the attached temperature sensor(s) 17. In particular, as the brush 6 wears, one or more of the temperature sensors at 17a (which is normally in a hot pocket of air surrounded by the edges of window 9, the backside of RFID device 14 and one side of brush 6) can be exposed to ambient air conditions which fill the void left by the worn brush 6. That is, one or more of the temperature sensors 17a located proximate the top back of the RFID device 14 will detect a temperature shift from the previous condition when the brush 6 covered the window 9. The RFID device 14 can detect this temperature shift from the temperature sensors and provide indication of this shift, e.g., to a brush holder monitoring system 18 (FIG. 5). The brush holder monitoring system 18 may also compare the temperatures of temperature sensors 17a and 17b to each other and temperature sensor 17c, measuring ambient, as well as to corresponding temperatures other brush holders 4 for further confirmation of the change in brush conditions (i.e., change in current and/or presence of sparking or arcing) and short-brush condition.

The temperature sensor(s) 17 can be connected to the 4 via any conventional means (e.g., one or more of adhesive, clip(s), binding(s), tape, etc.), and can be electrically and/or thermally connected to the RFID device 14 via any conventional means (e.g., hard-wire, wireless connection, thermocouple, etc.). The temperature sensor system may include one or more of a thermocouple, RTD, or equivalent temperature sensor.

Also shown is an additional sensor 19, which could include one or more of an electromagnetic sensor, temperature sensor, pressure sensor, strain sensors, acceleration sensor, resistance sensor, electromechanical sensor, magnetoresistive sensors, hall effect sensor, current measurement sensor etc., which can indicate the wear of brush 6 within the brush holder 4. The sensor(s) can be located on (in physical contact with) and/or proximate to, a brush holder 4, for assessing the general condition of the brush 4 and/or commutator 7. The additional sensor(s) 19 can provide an indicator of one or more detected conditions to the brush holder monitoring system 18 (FIG. 5), similarly to temperature indication.

FIG. 5 shows a schematic depiction of a data environment, including the RFID device 14 (operably connected with the brush holder 4) and the brush holder monitoring system 18, which may encompass one or more RFID receiver(s) 16 and/or or an analysis system(s) 22. The RFID device 14, and in particular, the antenna(e) 30, are capable of on-board power generation (via interaction with the RFID receiver(s)/reader 16). That is, the RFID device 14 in some embodiments includes a passive RFID tag. In these embodiments, the RFID device 14 uses radio frequency energy transmitted from the RFID receiver(s)/reader 16 as its power source. During operation, the antenna(e) 30 receive the radio transmission from the RFID receiver(s)/reader 16, and uses the radio transmission as a power source so that it may transmit data (e.g., via transmission component 34) back to the RFID receiver(s)/reader 16 at the brush holder monitoring system 18. As described herein, the antenna(e) 30 may transmit data obtained from the temperature sensor system 15, which may indicate a temperature differential between the temperature sensors 17*a*, 17*b*, or simply a temperature which falls outside of a predetermined range.

The RFID receiver(s) 16 can include any conventional RFID receiver devices capable of receiving a signal from an RFID device having a transmitter (such as RFID device 14). The RFID receiver(s) 16 can be configured to either passively receive signals from the RFID device 14, or actively poll for such signals. As described herein, the RFID receiver(s) 16 can be linked with the analysis system 22 to provide data received from the RFID device 14 about a condition of the brush holder 4. As noted herein, the analysis system 22 is configured to receive at least one indicator of the current level within the brush holder 4 and/or a temperature of the brush holder 4, from the RFID receiver(s) 16, and compare that indicator to a threshold to determine whether the at least one indicator exceeds a predetermined limit. The predetermined limit may be dictated by a desired operating condition of the brush holder 4, such as a desirable operating temperature or current level within the brush holder 4. Additionally, the predetermined limit may be dictated by a desired operating condition of a dynamoelectric machine including the brush holder 4.

The brush holder monitoring system 18 (including the analysis system 22) can include any conventional computer system including one or more processors, storage devices, buses, and/or user interfaces. The brush holder monitoring system 18 can include both hardware and software configured to perform the monitoring processes described herein. Further, the brush holder monitoring system 18 can execute program code to perform the functions described herein (e.g., analyzing data received at the RFID receiver(s) 16). In any case, the technical effect of the brush holder monitoring system 18 is to monitor parameters (e.g., temperature) of a brush holder 4 in conjunction with the RFID device 14 and the RFID receiver(s) 16.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus, comprising:
    a brush holder including a window,
    wherein the brush is for contacting a commutator; and
    a radio frequency identification (RFID) device affixed to the brush holder, the RFID device including:
        a temperature sensor system for determining temperatures at one or more distinct locations on the brush holder,
        the temperature sensor system including at least one temperature sensor; and
        a RFID transmitter for providing an indication of the temperatures.

2. The apparatus of claim 1, further comprising an RFID receiver for receiving the indication of temperatures differential from the RFID device.

3. The apparatus of claim 1, wherein the RFID device includes sensing.

4. The apparatus of claim 1, the RFID device further comprising a wear sensor for indicating wear in a brush within the brush holder.

5. The apparatus of claim 1, the temperature sensor system including a temperature sensor at each of the distinct locations on the brush holder, wherein a first one of the distinct locations is proximate the window, and a second one of the distinct locations is proximate a bottom of the brush holder.

6. The apparatus of claim 5, wherein the temperature sensor proximate the window detects a temperature change caused by a flow of air through the window as the brush wears.

7. The apparatus of claim 6, wherein each of the temperature sensors is directly on one or more faces of the brush holder.

8. A brush holder monitoring system, comprising:
    a radio frequency identification (RFID) device operably connected to a brush holder having a window, the RFID device including:
        a temperature sensor system for determining a temperature at distinct locations on a brush holder,
        the temperature sensor system including a temperature sensor at each of the distinct locations on the brush holder,
        wherein a first one of the distinct locations is proximate the window, and a second one of the distinct locations is proximate a bottom of the brush holder; and
        a transmitter for providing an indication of the temperature at each of the distinct locations on the brush holder.

9. The system of claim 8, wherein the RFID device includes sensing.

10. The system of claim 8, further comprising an RFID receiver for receiving the indication of temperatures from the RFID device.

11. The system of claim 8, the RFID device further comprising a wear sensor for indicating wear in a brush within the brush holder.

12. The system of claim 8, further comprising:
    an RFID receiver for obtaining the indication of the temperature at each of the distinct locations on the brush holder; and
    an analysis system for comparing the indication to a threshold to determine a condition of a brush within the brush holder.

13. The monitoring system of claim 8, wherein the temperature sensor proximate the window detects a temperature change caused by a flow of air through the window as the brush wears.

14. The monitoring system of claim 13, wherein each of the temperature sensors is directly on one or more faces of the brush holder.

15. An apparatus, comprising:
a brush holder having a window;
a radio frequency identification (RFID) device affixed to a brush holder, the RFID device including:
  a temperature sensor system for determining a temperature at distinct locations on the brush holder,
  the temperature sensor system including a temperature sensor at each of the distinct locations on the brush holder,
  wherein a first one of the distinct locations is proximate the window, and a second one of the distinct locations is proximate a bottom of the brush holder; and
  a transmitter for providing an indication of the temperature at each of the distinct locations on the brush holder;
a RFID receiver for receiving the indication of the temperature at each of the distinct locations on the brush holder from the RFID device; and
an analysis system for comparing the indications to a threshold to determine a condition of a brush within the brush holder.

16. The apparatus of claim 15, the RFID device further comprising a wear sensor for indicating wear in a brush within the brush holder.

17. The apparatus of claim 15, wherein the temperature sensor proximate the window detects a temperature change caused by a flow of air through the window as the brush wears.

18. The apparatus of claim 17, wherein each of the temperature sensors is directly on one or more faces of the brush holder.

* * * * *